United States Patent
Hwang et al.

(10) Patent No.: US 9,837,675 B2
(45) Date of Patent: Dec. 5, 2017

(54) FUEL SUPPLYING APPARATUS AND SYSTEM FOR DIRECT CARBON FUEL CELL

(71) Applicant: KOREA INSTITUTE OF INDUSTRIAL TECHNOLOGY, Cheonan-si (KR)

(72) Inventors: Jun-Young Hwang, Yongin-si (KR); Heui-Seok Kang, Seoul (KR); Kyung-Tae Kang, Seoul (KR); Sang-Ho Lee, Seoul (KR)

(*) Notice: Subject to any disclaimer, the term of this patent is extended or adjusted under 35 U.S.C. 154(b) by 341 days.

(21) Appl. No.: 14/414,890

(22) PCT Filed: Jul. 9, 2013

(86) PCT No.: PCT/KR2013/006097
§ 371 (c)(1),
(2) Date: Jan. 14, 2015

(87) PCT Pub. No.: WO2014/014228
PCT Pub. Date: Jan. 23, 2014

(65) Prior Publication Data
US 2015/0188166 A1 Jul. 2, 2015

(30) Foreign Application Priority Data

Jul. 16, 2012 (KR) ........................ 10-2012-0077143

(51) Int. Cl.
*H01M 8/04082* (2016.01)
*H01M 8/1009* (2016.01)
(Continued)

(52) U.S. Cl.
CPC ... *H01M 8/04216* (2013.01); *H01M 8/04186* (2013.01); *H01M 8/04201* (2013.01);
(Continued)

(58) Field of Classification Search
CPC ......... H01M 8/04216; H01M 8/04186; H01M 8/225; H01M 8/083; H01M 8/0656;
(Continued)

(56) References Cited

U.S. PATENT DOCUMENTS 4,128,343 A 12/1978 Moked et al.
4,944,598 A 7/1990 Steele
(Continued)

FOREIGN PATENT DOCUMENTS

JP 06-238146 8/1994
JP 07-024286 1/1995
JP 2007-130510 5/2007

OTHER PUBLICATIONS

English translation of 06-238146.
English translation of 2007-130510.
English translation of 07-024286.

*Primary Examiner* — Ula C Ruddock
*Assistant Examiner* — Thomas Parsons
(74) *Attorney, Agent, or Firm* — Antonio Ha & U.S. Patent, LLC

(57) ABSTRACT

Disclosed is a fuel supplying apparatus, for a direct carbon fuel cell, which has improved output density by ensuring the flow properties of an anode medium. The fuel supplying apparatus for a direct carbon fuel cell comprises: a flow pipe which forms it cylindrical flow path in the vertical direction around a tube-shaped cell contained in an anode medium in which a carbon fuel is mixed; and a bubbling means which provides a gas from below the flow pipe to the inside of the anode medium and thus enables the anode medium to flow by the vertical flow of the gas. Consequently, the anode medium is provided to the anode of the tube-shaped cell by the flow.

13 Claims, 8 Drawing Sheets

(51) Int. Cl.
  *H01M 8/0612* (2016.01)
  *H01M 8/0656* (2016.01)
  *H01M 8/1246* (2016.01)
  *H01M 8/083* (2016.01)
  *H01M 8/22* (2006.01)
  *H01M 8/04186* (2016.01)
  *H01M 8/124* (2016.01)

(52) U.S. Cl.
  CPC ....... *H01M 8/0618* (2013.01); *H01M 8/0656* (2013.01); *H01M 8/083* (2013.01); *H01M 8/1009* (2013.01); *H01M 8/1246* (2013.01); *H01M 8/225* (2013.01); *H01M 2008/1293* (2013.01); *H01M 2300/0071* (2013.01)

(58) Field of Classification Search
  CPC ............. H01M 8/1246; H01M 8/0618; H01M 8/04201; H01M 8/1009; H01M 2008/1293; H01M 2300/0071
  See application file for complete search history.

(56) References Cited

U.S. PATENT DOCUMENTS

| | | | |
|---|---|---|---|
| 2006/0234098 A1 | 10/2006 | Gur | |
| 2009/0117429 A1* | 5/2009 | Zillmer | B01D 15/00 |
| | | | 429/419 |
| 2013/0196238 A1* | 8/2013 | Harjes | H01M 8/1233 |
| | | | 429/409 |

* cited by examiner

FUEL SUPPLYING APPARATUS AND SYSTEM FOR DIRECT CARBON FUEL CELL

TECHNICAL FIELD

The present invention relates to a direct carbon fuel cell, and more specifically, to a fuel supplying apparatus and system for a direct carbon fuel cell, which have improved output density by ensuring the flow properties of an anode medium.

DISCUSSION OF RELATED ART

While rich countries struggle to reduce $CO_2$ emissions, China, India, and other rising economies are consuming more and more fossil fuels with a high demand for energy. Coal is taking up its position as an important energy resource with its vast worldwide reserves.

However, this fuel source is challenged by steadily increasing $CO_2$ emissions. To address the issue, various approaches are being attempted, which include efficient carbon conversion, extracting pure coal, and direct use of coal as a fuel. However, they are difficult to generally adopt under different situations and in terms of efficiency and costs.

An attention-receiving alternative is the direct carbon fuel cell (DCFC) technique that may produce gigawatt power by employing coal as an energy source while recycling waste heat.

This novel technology would play is critical role in the distributed power generation industry.

DCFC power generation systems exhibit a high energy conversion efficiency reaching about 80%, which is higher than the thermal power generation systems and the highest among all the existing types of fuel cell systems. Unlike other fuel cells, the DCFC directly uses coal or other carbon-containing material as its furl, which leads to many environmental or economic benefits, such as reduced emissions of $SO_x$, $NO_x$, PM, $CO_2$, or other pollutants and noise-free power generation.

A DCFC includes a cathode, an anode, and an electrolyte. Oxygen ions generated by a reduction reaction at the cathode travel to the anode via the electrolyte. The oxygen ions react with carbon at the anode, thus producing $CO_2$. $CO_2$ reacts with the oxygen ions to generate carbonate ions. The carbonate ions oxidize the carbon to generate $CO_2$ and electrons, generating, electricity.

FIG. 1 schematically illustrates an example of power generation by a DCFC.

In order to reduce concentration polarization of the anode to increase output density, the cathode-supported solid oxide electrolyte direct carbon fuel cells using molten carbonate as its anode medium requires the carbon fuel to be mixed well with the anode medium together with forcedly supplying the anode medium to the fuel cell.

Accordingly, a need exists for a method for forcing the anode medium, i.e., molten carbonate, to flow.

A proposed conventional method is to use a liquid pump.

However, this method is challenged by the high-corrosive molten carbonate whose temperatures reaches 700° C. to 1000° C.

SUMMARY

An object of the present invention is to provide a fuel supplying apparatus and system for a direct carbon fuel cell, which may increase power density by forcing the molten carbonate, an anode medium, to flow to thereby reduce the concentration polarization of the anode.

Another object of the present invention is to provide a fuel supplying apparatus and system for a direct carbon fuel cell, which may forcedly mix the anode medium formed of a molten carbonate with a carbon fuel and supply the mix to the anode of the direct carbon fuel cell.

Still another object of the present invention is to provide a fuel supplying apparatus and system for a direct carbon fuel cell, in which a flow pipe is formed around one or more tubular cells each including an cathode supporter and a solid oxide electrolyte, and the anode medium may be forced to flow in the flow pipe by the flow of carbon dioxide.

Yet still another object of the present invention is to provide a fuel supplying apparatus and system for a direct carbon fuel cell, in which a flow path is formed around the tubular cell to secure a flow of an anode medium, and a separating pipe is formed inside the flow path to allow the anode medium in the external flow path between the flow path and the separating pipe to vertically move so as to generate a flow of the anode medium in the internal flow path inside the separating pipe.

Yet still another object of the present invention is to provide a fuel supplying apparatus and system for a direct carbon fuel cell, in which a flow path is formed around a tubular cell, and a separating pipe is formed inside the flow path to prevent a gas from flowing from outside the separating pipe into the inside thereof.

According to the present invention, a fuel supplying apparatus for a direct carbon fuel cell comprises: a separating pipe forming a cylindrical internal flow path in a vertical direction around a tubular cell soaked in an anode medium mixed with a carbon fuel, a separating pipe having a through-hole through which the anode medium may enter and exit; a flow pipe forming a cylindrical external flow path in the vertical direction around the separating pipe; and a bubbling means supplying a gas to the external flow path between the flow pipe and the separating pipe, wherein as the gas supplied to the external, flow path vertically moves, the anode medium in the external flow path primarily flows, and the anode medium in the internal flow path communicating with the external flow path through the through-hole secondarily flows.

Here, the flow pipe may include a collecting part widening downwards, and the collecting part may guide the gas supplied to a lower portion of the flow pipe to the external flow path.

The bubbling means may include a supplying pipe supplying the gas, and an end of the supplying pipe may be configured to supply the gas to the external flow path between the flow path and the separating pipe.

The supplying pipe of the bubbling means may be configured to extend along an outer wall of the flow path from an upper portion to a lower portion thereof.

The supplying pipe may be spirally formed along the outer wall of the flow pipe.

The fuel supplying apparatus may further comprise a distributing member in the external flow path between the flow path and the separating pipe, the distributing member distributing the gas supplied from the bubbling means and supplying upward the distributed gas.

The distributing member may be formed of a ring-shaped plate with multiple through-holes.

The distributing member may include a porous layer.

The bubbling means may independently generate and provide the gas.

The bubbling means may re-circulate and supply the gas that is generated by an electrochemical reaction of the carbon fuel and is then discharged to an outside of the anode medium.

The through-hole of the bubbling means may have a slope ascending to an outside thereof.

The separating pipe may include a guide formed at an inner wall thereof to abut the through-hole, the guide guiding a flow of an internal fluid to an outside thereof.

The separating pipe may form the internal flow path around a plurality of tube-type cells.

Meanwhile, according to the present invention, a direct carbon fuel cell system comprises: one or more tubular cells each including an cathode formed at an inside thereof, an anode firmed at an outside thereof, and a solid oxide electrolyte formed between the cathode and the anode; and the fuel supplying apparatus supplying a forcedly flowing, anode medium to the tubular cells.

Effects of the Invention

As such, according to the present invention, a flow of the anode medium in the flow pipe may be secured, forcing the anode medium to be supplied to the direct carbon fuel cell, with the anode medium mixed with a carbon fuel.

Further, according to the present invention, the separating pipe may be provided in the flow pipe, and the anode medium in the internal flow path inside the separating pipe may be caused to flow by the movement of carbon dioxide in the external flow path between the flow pipe and the separating pipe.

Therefore, the concentration polarization at the anode of the tubular cell in the direct carbon fuel cell may be reduced, leading to an increased output density.

Further the gas in the external flow path may be prevented by the operation of the separating pipe from flowing from outside the separating pipe to the inside thereof, thus further increasing the output density.

DESCRIPTION OF EXEMPLARY EMBODIMENTS

Hereinafter, embodiments of the present invention are described in detail with reference to the accompanying drawings. The terms used herein should be interpreted not in typical or dictionary definitions but to comply in concept with the technical matters of the present invention.

The configurations disclosed in the specification and the drawings are mere examples and do not overall represent the technical spirit of the present invention. Therefore, various changes may be made thereto, and equivalents thereof also belong to the scope of the present invention.

Disclosed is a fuel supplying apparatus for a direct carbon fuel cell having a structure in which power generation is conducted with a tube-type cell is soaked in a mixture of a liquid anode medium and a carbon fuel.

Here, the tube-type cell has a structure in which a cathode and an anode are respectively formed at an inside and outside of the tube-type cell, with a solid oxide electrolyte formed between the cathode and the anode.

The cathode may include lanthanum strontium manganite (LSM), and the electrolyte may include atria-stabilized zirconia (YSZ). The anode may include carbon fuel particles mixed with a circulatable molten salt.

The anode medium may include a molten carbonate, and the carbon fuel may include a carbon powder, a coal powder, coke, a biomass fuel, and an organic waste.

Figure 2:
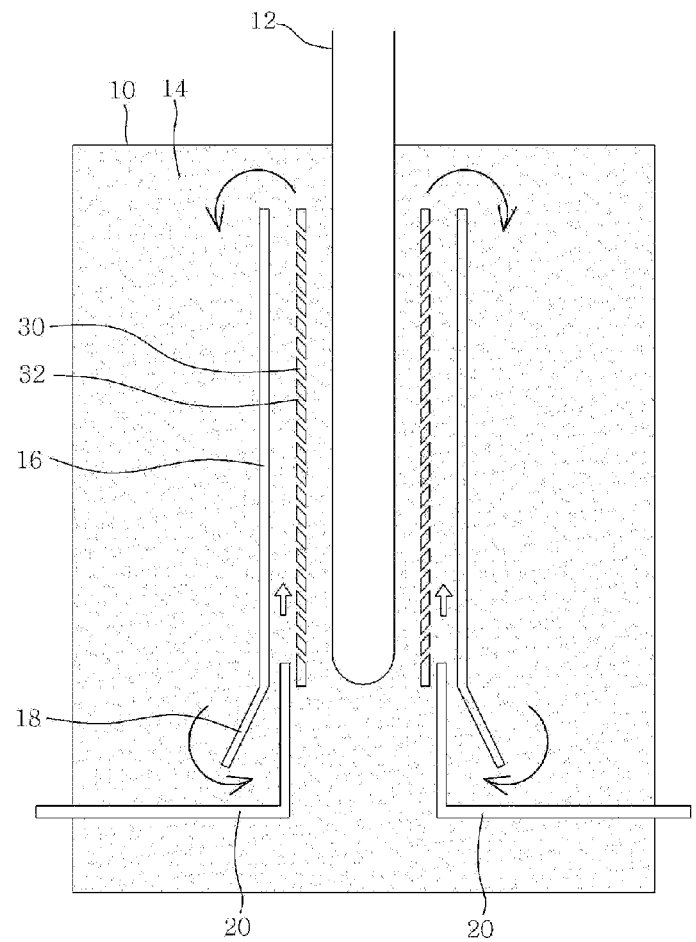
FIG. 2 is a view illustrating a configuration of a fuel supplying apparatus for as direct carbon fuel cell according to a preferred embodiment of the present invention.

Referring to FIG. 2, according to the present invention, one more type-type cells 12 are soaked in a molten carbonate, an anode medium 14 contained in a bath 10.

According to an embodiment of the present invention, a flow pipe 16 is provided to for a vertical-directional cylindrical flow path around the periphery of the tube-type cell 12 soaked in the anode medium 14 contained in the bath 10.

The flow pipe 16 has a cylindrical upper portion and a lower portion that is referred to as a collecting part 18 widening downwards.

According to an embodiment of the present invention, a separating pipe 30 is formed inside, the flow pipe 16. An external flow path is formed between the flow pipe 16 and the separating pipe 30. The tubular cell 12 is positioned inside the separating pipe 30, and an internal flow path is formed inside the separating pipe 30.

The separating pipe 30 has a plurality of through-holes 32 through which the anode medium 14 enter and exit, and each through-hole 32 is preferably formed to have a slope ascending from the inside of the separating pipe 30 to the outside thereof.

The plurality of through-holes 32 may have various arrangements and shapes with respect to a wall body of the separating pipe 30 according to the manufacturer's intention, and description of specific examples thereof is omitted.

The structure of the through-holes 32 each having an ascending slope from the inside of the separating pipe 30 to the outside may prevent carbon dioxide moving through the external flow path from flowing into the internal flow path while circulating the anode medium 14 moving through the internal flow path to the outside.

The flow pipe 16 and the separating pipe 30 are disposed to be completely soaked in the anode medium 14 so that flows may be created at upper sides and lower sides of the flow pipe 16 and the separating pipe 30.

Figure 1:
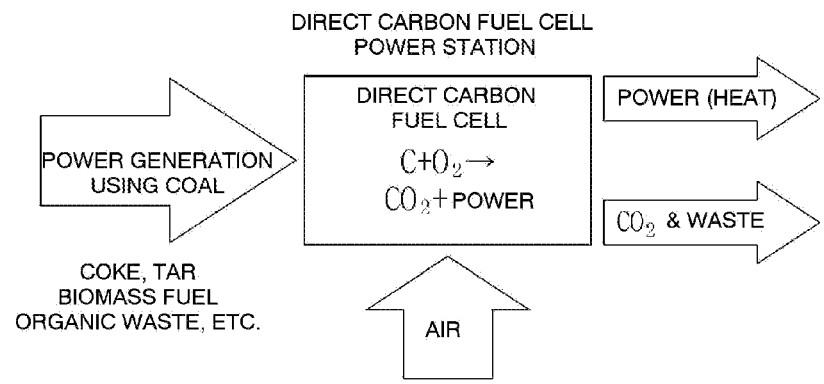
FIG. 1 is a view schematically illustrating an example of generating power in a typical direct carbon fuel cell.

According to an embodiment of the present invention, a bubbling means is further provided to supply a gas to a lower portion of the flow pipe 16. Here, the gas is preferably carbon dioxide ($CO_2$) that is generated as a result of the electrochemical reaction shown in FIG. 1. For the purpose of description, the gas is hereinafter carbon dioxide.

Figure 3:
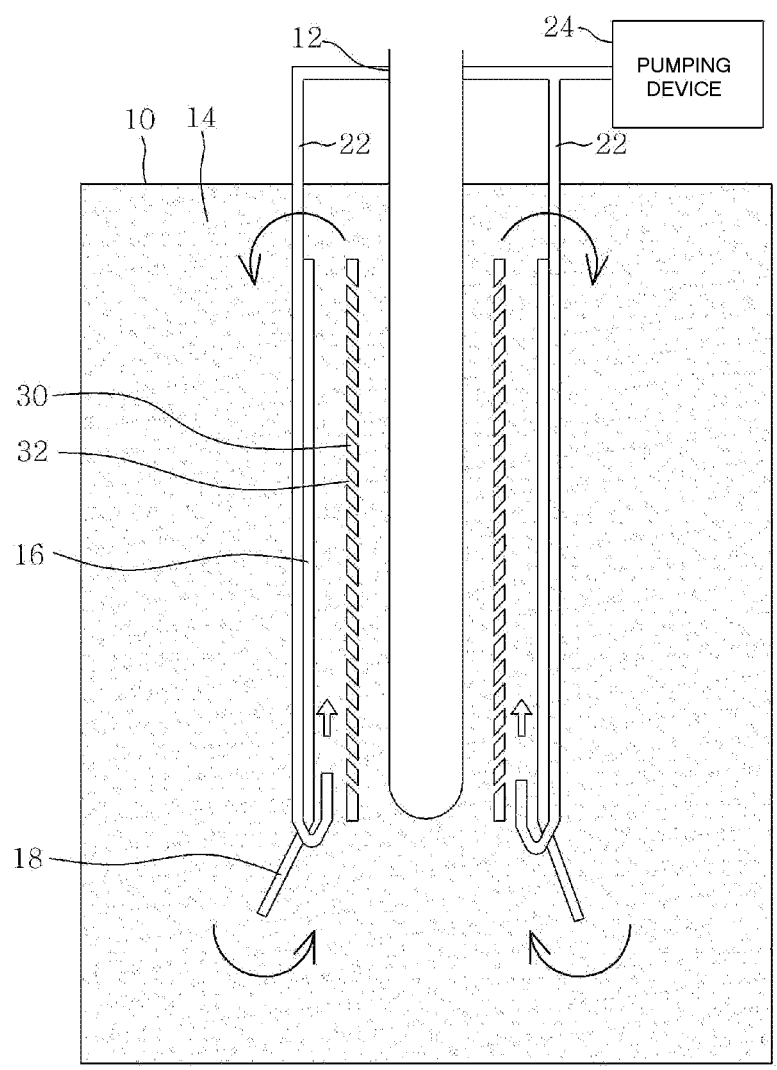
FIGS. 3 and 4 are views illustrating variations of the configuration shown in FIG. 2, adopting different methods for supplying carbon dioxide, according to other embodiments of the present invention.
Figure 4:
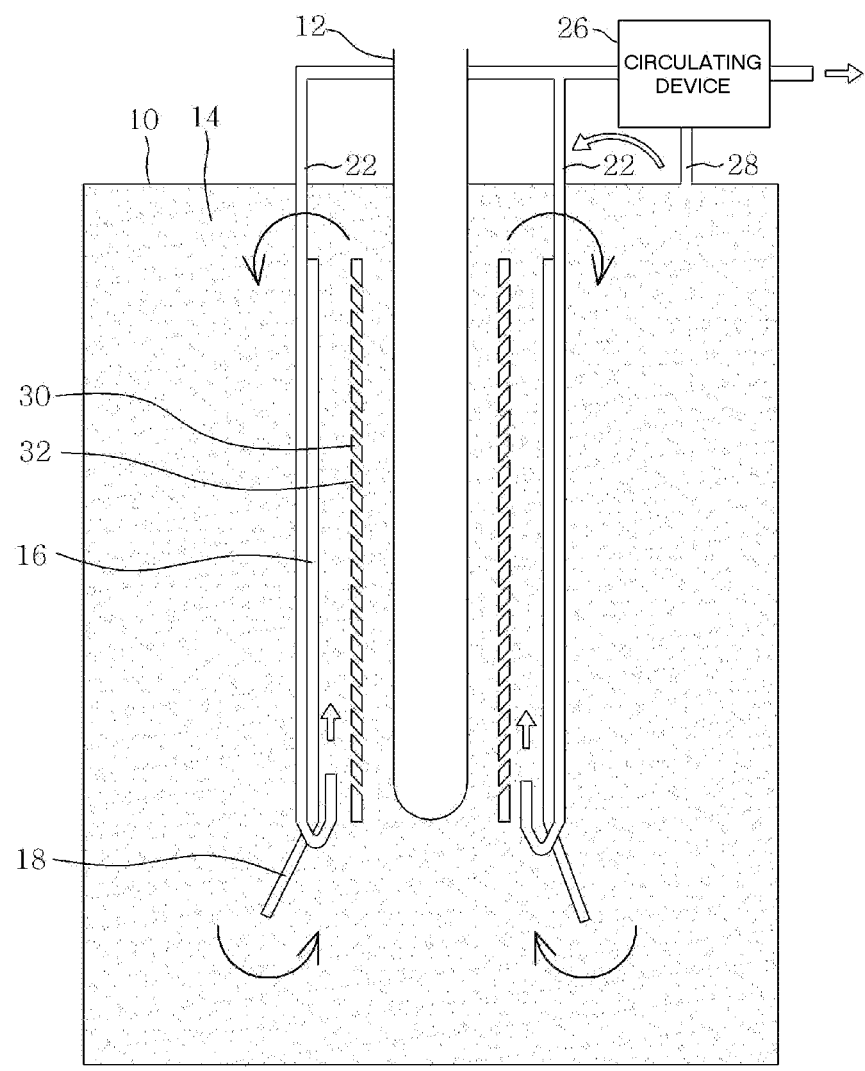

The bubbling means may include a supplying pipe 20 that extends to under the flow pipe 16 to supply carbon dioxide as shown in FIG. 2 or the bubbling means may include a supplying pipe 22 that extends from an upper portion to a lower portion thereof along an outer wall of the flow pipe 16 as shown in FIGS. 3 and 4.

In case the bubbling means includes the supplying pipe 20 extending to under the flow pipe 16 as shown in FIG. 2, an end of the supplying pipe 20 may be formed to directly supply carbon dioxide to the external flow path between the flow pipe 16 and the separating pipe 30 and to allow the supplied carbon dioxide to move upwards.

In case the bubbling means includes the supplying pipe 22 extending from an upper portion to a lower portion thereof along the flow pipe 16 as shown in FIGS. 3 and 4, an end of the supplying pipe 22 is preferably formed at an inside of a lower portion of the flow pipe 16. More preferably, the end of the supplying pipe 22 may be configured to pass through the collecting part. 18 to supply carbon dioxide to the external flow path between the flow pipe 16 and the separating pipe 30.

The bubbling means including the supplying pipes 20 and 22 as shown in FIGS. 2 and 3 may include a pumping device 24 that may independently generate and provide carbon dioxide.

Alternatively, the bubbling means may re-circulate and supply carbon dioxide generated by an electrochemical reaction inside the bath 10, as shown in FIG. 4. To this end, the bubbling means may include a circulating device 26 that externally collects carbon dioxide generated by an electrochemical reaction in the bath 10 while re-circulating and supplying a portion of the generated carbon dioxide through the supplying pipe 22.

Referring to FIG. 4, the circulating device 26 may be configured to discharge the carbon dioxide collected to an upper portion of the bath 10 to the outside through an exhaust pipe 28 while circulating and supplying a portion of the carbon dioxide to the supplying pipe 22.

Further, according to embodiments of the present invention, the supplying pipes 20 and 22 shown in FIGS. 2 to 4 may be configured to spirally wind up along an outer side of the flow pipe 16.

By the configurations shown in FIGS. 2 to 4, according to an embodiment of the present invention, carbon dioxide may be supplied to the external flow path between the flow pipe 16 and the separating pipe 30.

The carbon dioxide supplied from the end of the supplying pipe 20 of the bubbling means to the external flow path between the flow pipe 16 and the separating pipe 30 is vertically moved through the external flow path.

As the carbon dioxide moves vertically along the external flow path between the flow pipe 16 and the separating pipe 30, the anode medium 14 over the flow path may be pushed to flow by the vertically moving carbon dioxide.

In this case, the ascending carbon dioxide may be prevented from flowing into the internal flow path by the structure of the through-holes 32.

As the carbon dioxide is steadily supplied to the external flow path between the flow pipe 16 and the separating pipe 30 to create a flow of the anode medium 14, the anode medium 14 flows from outside the flow pipe 16 to the external flow path to fill the space that is formed as the carbon dioxide ascends at a lower portion of the external flow path between the flow pipe 16 and the separating pipe 30, and the anode medium 14 is forced to overflow to the outside by the ascending carbon dioxide at an upper portion of the external flow path between the flow pipe 16 and the separating pipe 30.

Accordingly, the anode medium 14 may be circulated through the flow pipe 16 in the bath 10.

In this case, when the anode medium 14 in the external flow path flows as the carbon dioxide moves, the anode medium 14 in the internal flow path inside the separating pipe 30 is caused to flow as well by the flow of the anode medium 14 in the external flow path.

As described above, as the anode medium 14 flows and circulates along the external flow path and the internal flow path, the mixture of the carbon fuel and the anode medium 14 may be accelerated.

Further, the mixture-accelerated carbon fuel and anode medium 14 circulate through the internal flow path inside the separating pipe 30, while abutting the tube-type cell 12. Therefore, the reaction of the anode of the tube-type cell 12 may be accelerated by the circulating carbon cell and anode medium 14.

A portion of the anode medium 14 flowing upwards along the internal flow path inside the separating pipe 30 may be moved through the through-holes 32 to the external flow path.

The flow of the anode medium 14 in the internal flow path may allow the carbon dioxide generated by the reaction to flow without sticking to the outer wall of the tubular cell 12. Therefore, the reaction at the outer wall of the tubular cell 12 may be prevented from being interfered by carbon dioxide.

The circulation of the anode medium 14 by carbon dioxide as described in connection with FIG. 2 applies likewise to the configurations shown in FIGS. 3 and 4. Thus, substantially the same effects may be expected, and duplicated descriptions thereof are omitted.

Figure 5:
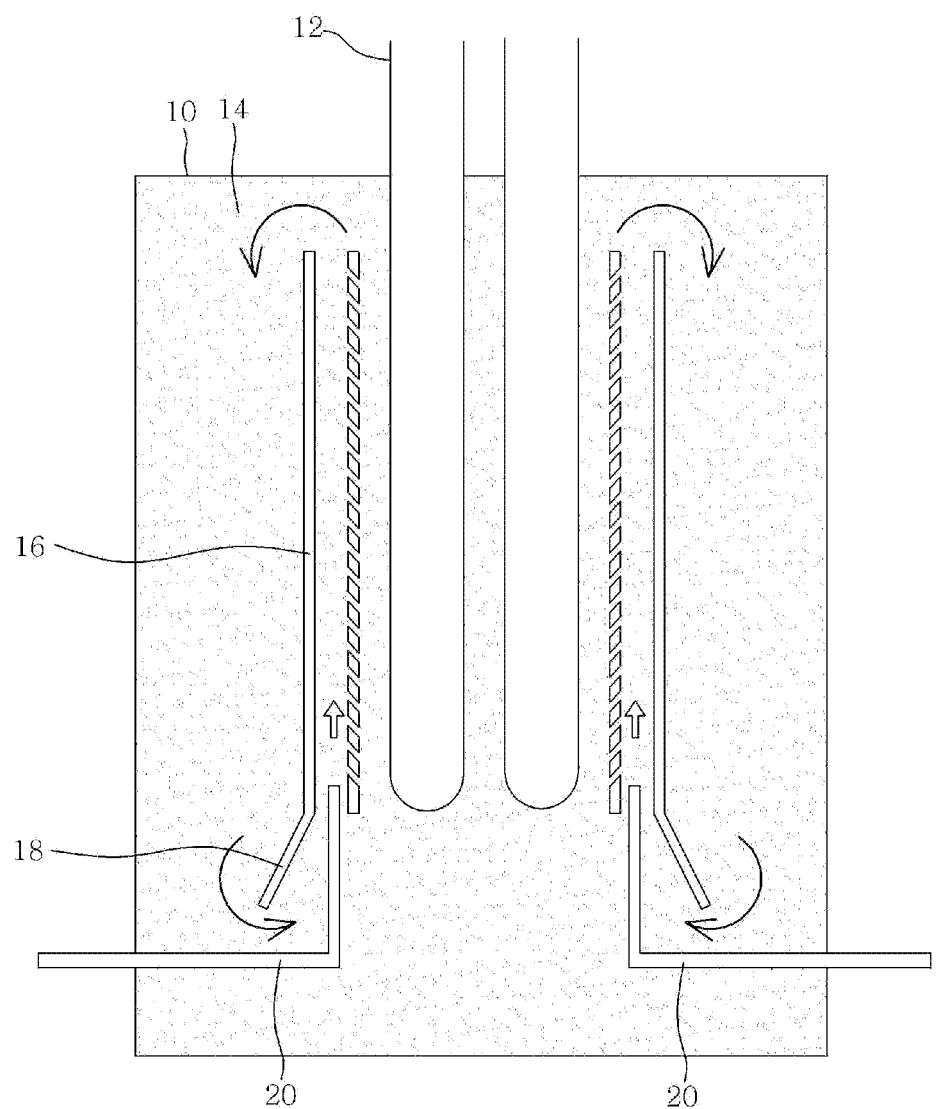
FIGS. 5 to 7 are views illustrating respective corresponding variations of the configurations shown in FIGS. 2 to 4, with to plurality of tube-type cells, according to other embodiments of the present invention.
Figure 6:
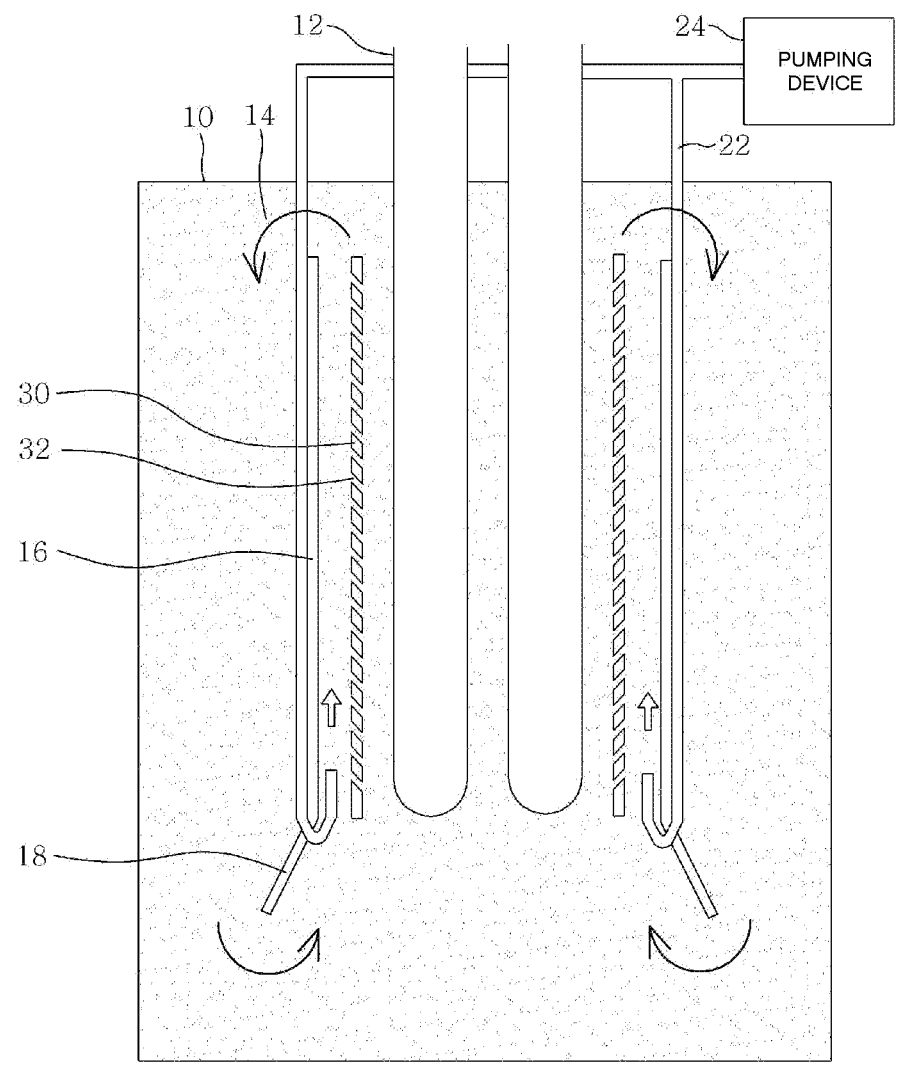
Figure 7:
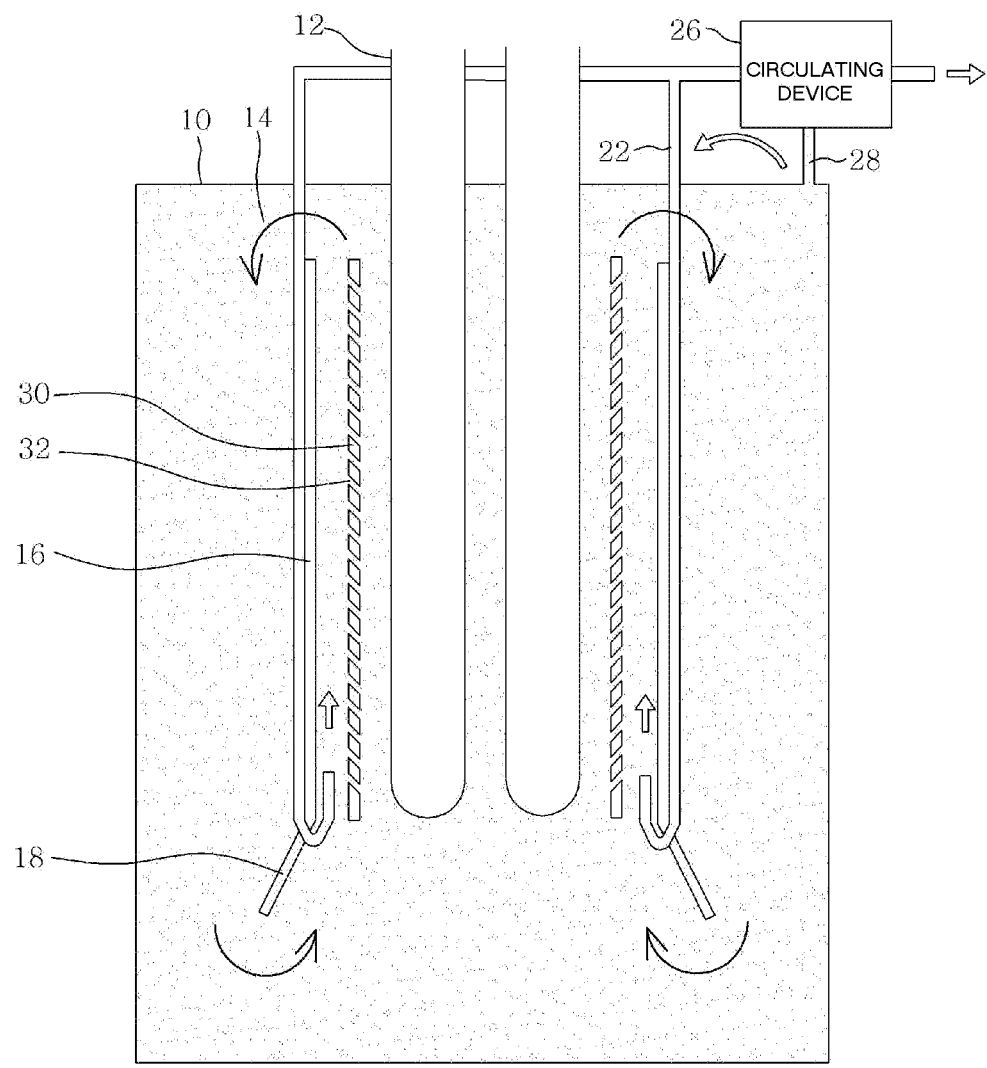

Meanwhile, according to an embodiment of the present invention, a plurality of tube-type cells 12 may be configured inside the flow pipe 16, as shown in FIGS. 5 to 7. According to an embodiment of the present invention, two tube-type cells 12 are, for the purpose of description, configured as shown in FIGS. 5 to 7.

FIG. 5 illustrates an example in which two tube-type cells 12 are configured inside the flow pipe 16, corresponding to FIG. 2, FIG. 6 illustrates an example in which two tube-type cells 12 are configured inside the flow pipe 16, corresponding to FIG. 3, and FIG. 7 illustrates an example in which two tithe-type cells 12 are configured inside the flow pipe 16, corresponding to FIG. 4.

The configurations shown in FIGS. 5 to 7 are substantially the same as those shown in FIGS. 2 to 4 except for a plurality of tube-type cells 12 (two tube-type cells 12) configured inside the flow pipe 16, and description of the same components or their operations is not repeated.

The number of tube-type cells 12 arranged in the flow pipe 16 may be varied depending on the manufacturer's intention considering the flow efficiency of the anode medium.

Also in the embodiments described in connection with FIGS. 5 to 7, as carbon dioxide supplied from an end of the supplying pipe 20 or 22 included in the bubbling means to the external flow path between the flow pipe 16 and the separating pipe 30 moves upwards, the anode medium 14 in the internal flow path is caused to flow as described above in connection with FIGS. 2 to 4.

Figure 8:
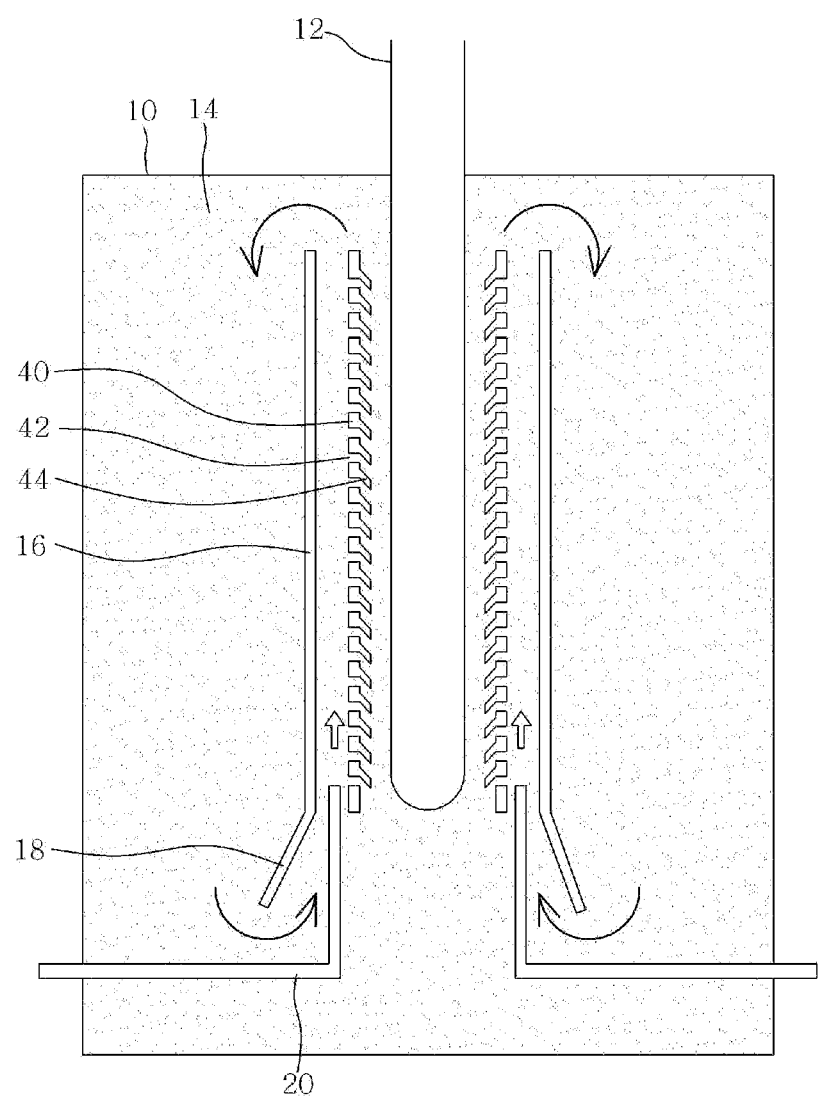
FIG. 8 is a view illustrating a variation of the configuration shown in FIG. 3, with a separating pipe, according to another embodiment of the present invention.

Meanwhile, according to an embodiment of the present invention, a separating pipe 40 may be configured which has a structure as shown in FIG. 8.

As shown in FIG. 8, the separating, pipe 40 includes through-holes 42 and guides 44 corresponding to the through-holes 42.

In other words, the separating pipe 40 includes the guides 44 that guide a flow of the fluid in the external flow path to the outside.

Each guide 44 is configured to extend to an upper portion of an inlet of its corresponding through-hole 42 and to be inclined to an inside lower portion thereof.

Therefore, the guides 44 guide the fluid (anode medium 14 or carbon dioxide) introduced from thereunder to be discharged from the internal, flow path through the through-holes 42 to the external flow path.

The separating pipe 40 of FIG. 8 may be replaced with the separating pipe 30 of FIGS. 2 to 4, which may result in the same effects and operations as those described in connection with FIGS. 2 to 4, and duplicate descriptions thereof are thus omitted.

Figure 9:
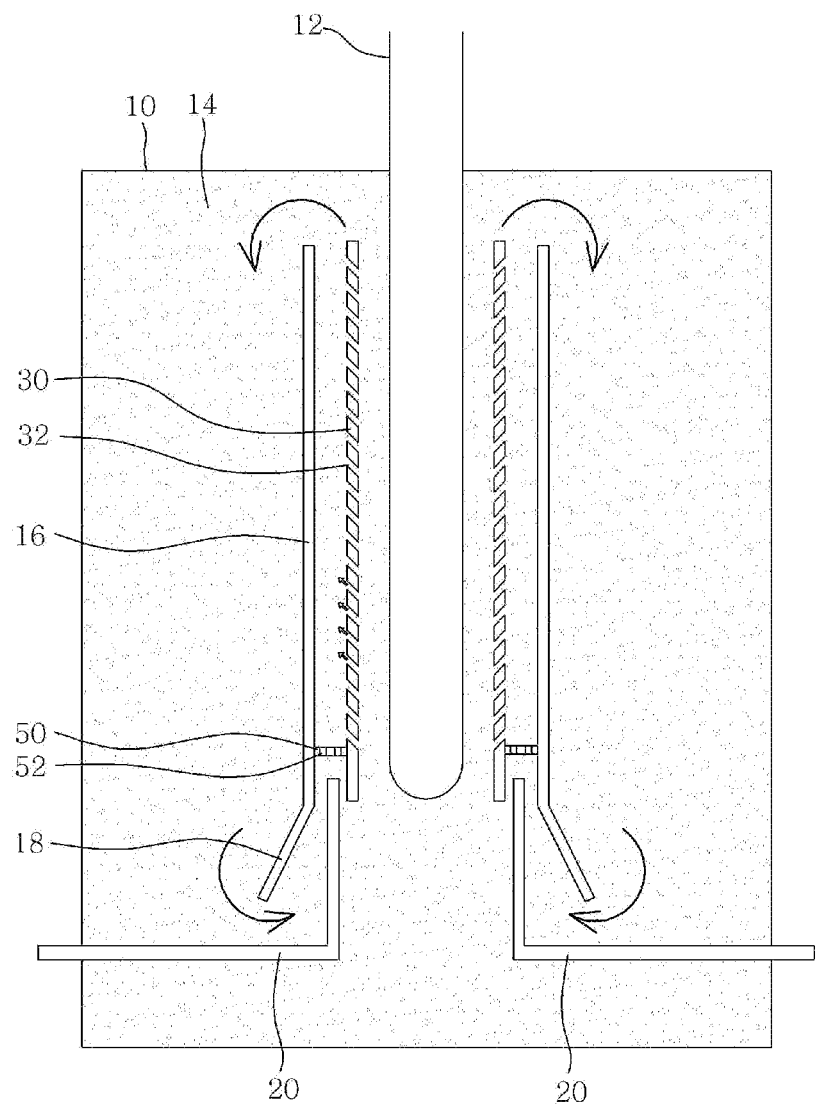
FIG. 9 is a view illustrating a variation of the configuration shown in FIG. 2, with a distributing member, according to another embodiment of the present invention.

Meanwhile, according to an embodiment of the present invention, a distributing means 50 may be further provided in the external flow path between the flow pipe 16 and the separating pipe 30 to distribute gas bubbles supplied from the supplying pipe 20 of the bubbling means and to supply upwards the distributed gas bubbles, as shown in FIG. 9.

The distributing member 50 may be formed of a ring-shaped plate having multiple through-holes 52 as shown in FIG. 8. The distributing member 50 may have various shapes according to the manufacturer's intention. By way of example, the distributing member 50 may have a porous layer.

As such, according to the present invention, a flow of the anode medium may be secured, forcing the anode medium to be supplied to the direct carbon fuel cell, with the anode medium mixed with a carbon fuel.

Further, according to the present invention, the separating pipe may be provided in the flow pipe, and the anode medium in the internal flow path inside the separating pipe may be caused to flow by the movement of carbon dioxide in the external flow path between the flow pipe and the separating pipe.

Therefore, the concentration polarization at the anode of the tubular cell may be reduced, leading to an increased output density.

Further, according to the present invention, the gas in the external flow path may be prevented from outside the separating pipe to the inside thereof, further increasing the output density.

What is claimed is:

1. A fuel supplying apparatus for a direct carbon fuel cell, comprising:
   a separating pipe forming a cylindrical internal flow path in a vertical direction around a tubular cell soaked in an anode medium mixed with a carbon fuel, a separating pipe having a through-hole through which the anode medium may enter and exit;
   a flow pipe forming a cylindrical external flow path in the vertical direction around the separating pipe; and
   a bubbling means supplying a gas to the external flow path between the flow pipe and the separating pipe, wherein as the gas supplied to the external flow path vertically moves, the anode medium in the external flow path primarily flows, and the anode medium in the internal flow path communicating with the external flow path through the through-hole secondarily flows,
   wherein the flow pipe includes a collecting part widening downwards,
   wherein the collecting part guides the gas supplied to a lower portion of the flow pipe to the external flow path,
   wherein the bubbling means includes a supplying pipe supplying the gas,
   wherein an end of the supplying pipe is configured to supply the gas to the external flow path between the flow path and the separating pipe, and
   wherein the through-hole of the separating pipe has a slope ascending to an outside thereof.

2. The fuel supplying apparatus of claim 1, wherein the supplying pipe of the bubbling means is configured to extend along an outer wall of the flow path from an upper portion to a lower portion thereof.

3. The fuel supplying apparatus of claim 2, wherein the supplying pipe is spirally formed along the outer wall of the flow path part.

4. The fuel supplying apparatus of claim 1, further comprising a distributing member in the external flow path between the flow path and the separating pipe, the distributing member distributing the gas supplied from the bubbling means and supplying upward the distributed gas.

5. The fuel supplying apparatus of claim 4, wherein the distributing member is formed of a ring-shaped plate with multiple through-holes.

6. The fuel supplying apparatus of claim 4, wherein the distributing member includes a porous layer.

7. The fuel supplying apparatus of claim 1, wherein the bubbling means independently generates and provides the gas.

8. The fuel supplying apparatus of claim 1, wherein the bubbling means re-circulates and supplies the gas that is generated by an electrochemical reaction of the carbon fuel and is then discharged to an outside of the anode medium.

9. The fuel supplying apparatus of claim 1, wherein the separating pipe includes a guide formed at an inner wall thereof to abut the through-hole, the guide guiding a flow of an internal fluid to an outside thereof.

10. The fuel supplying apparatus of claim 1, wherein the gas includes carbon dioxide.

11. The fuel supplying apparatus of claim 1, wherein the anode medium includes a molten carbonate.

12. The fuel supplying apparatus of claim 1, wherein the separating pipe forms the internal flow path around a plurality of tubular cells.

13. A direct carbon fuel cell system, comprising:
   one or more tubular cells each including a cathode formed at an inside thereof, an anode formed at an outside thereof, and a solid oxide electrolyte formed between the cathode and the anode; and
   a fuel supplying apparatus supplying a forcedly flowing anode medium to the tubular cell, wherein the fuel supplying apparatus for a direct carbon fuel cell, comprising:
   a separating pipe forming a cylindrical internal flow path in a vertical direction around a tubular cell soaked in an anode medium mixed with a carbon fuel, a separating pipe having a through-hole through which the anode medium may enter and exit;
   a flow pipe forming a cylindrical external flow path in the vertical direction around the separating pipe; and
   a bubbling means supplying a gas to the external flow path between the flow pipe and the separating pipe, wherein as the gas supplied to the external flow path vertically moves, the anode medium in the external flow path primarily flows, and the anode medium in the internal flow path communicating with the external flow path through the through-hole secondarily flows,
   wherein the flow pipe includes a collecting part widening downwards,
   wherein the collecting part guides the gas supplied to a lower portion of the flow pipe to the external flow path, wherein the bubbling means includes a supplying pipe supplying the gas, wherein an end of the supplying pipe is configured to supply the gas to the external flow path between the flow path and the separating pipe, and wherein the through-hole of the separating pipe has a slope ascending to an outside thereof.

* * * * *